United States Patent
Nakamura et al.

(10) Patent No.: US 11,587,553 B2
(45) Date of Patent: Feb. 21, 2023

(54) APPROPRIATE UTTERANCE ESTIMATE MODEL LEARNING APPARATUS, APPROPRIATE UTTERANCE JUDGEMENT APPARATUS, APPROPRIATE UTTERANCE ESTIMATE MODEL LEARNING METHOD, APPROPRIATE UTTERANCE JUDGEMENT METHOD, AND PROGRAM

(71) Applicant: NIPPON TELEGRAPH AND TELEPHONE CORPORATION, Tokyo (JP)

(72) Inventors: Takashi Nakamura, Tokyo (JP); Takaaki Fukutomi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 132 days.

(21) Appl. No.: 16/968,126

(22) PCT Filed: Feb. 7, 2019

(86) PCT No.: PCT/JP2019/004406
§ 371 (c)(1),
(2) Date: Aug. 6, 2020

(87) PCT Pub. No.: WO2019/156162
PCT Pub. Date: Aug. 15, 2019

(65) Prior Publication Data
US 2021/0035558 A1 Feb. 4, 2021

(30) Foreign Application Priority Data
Feb. 8, 2018 (JP) .............................. JP2018-020773

(51) Int. Cl.
*G10L 15/06* (2013.01)
*G10L 15/05* (2013.01)
(Continued)

(52) U.S. Cl.
CPC ............ *G10L 15/063* (2013.01); *G10L 15/05* (2013.01); *G10L 15/16* (2013.01); *G10L 15/22* (2013.01);
(Continued)

(58) Field of Classification Search
CPC ....... G10L 15/063; G10L 15/05; G10L 15/16; G10L 15/22; G10L 15/28;
(Continued)

(56) References Cited

U.S. PATENT DOCUMENTS 10,192,546 B1 * 1/2019 Piersol .................... G10L 17/22
10,332,508 B1 * 6/2019 Hoffmeister ........... G06N 7/005
2018/0102136 A1 * 4/2018 Ebenezer ................ G10L 15/16

FOREIGN PATENT DOCUMENTS

JP 2009025518 A * 2/2009
JP 2014191029 A * 10/2014
JP 2016134169 A * 7/2016 ............. G06F 40/20

OTHER PUBLICATIONS

Litman, Diane, et al., "Evaluating a Spoken Dialogue System that Detects and Adapts to User Affective States," Proceedings of the SIGDIAL 2014 Conference, pp. 181-185, Jun. 18-20, 2014.
(Continued)

*Primary Examiner* — Richemond Dorvil
*Assistant Examiner* — Alexander G Marlow

(57) ABSTRACT

Provided is technology for assessing whether uttered speech detected from input speech is speech suited to a prescribed purpose. A method comprises detecting, from input speech including speech uttered by a speaker and noise, the uttered speech corresponding to the speech uttered by the speaker, extracting an acoustic feature of the uttered speech, generating, from the uttered speech, a speech recognition result set with a recognition score, generating, from the speech recognition result set with the recognition score, a speech recognition result word vector expression set and a speech
(Continued)

recognition result part-of-speech vector expression set, generating a target utterance estimation model, providing, using the target utterance estimation model, a probability of the uttered speech being suited to the prescribed purpose, and outputting the uttered speech and the speech recognition result set with the recognition score, the the uttered speech suitable to the prescribed purpose.

20 Claims, 4 Drawing Sheets

(51) Int. Cl.
*G10L 15/16* (2006.01)
*G10L 15/22* (2006.01)
*G10L 15/28* (2013.01)

(52) U.S. Cl.
CPC ........ *G10L 15/28* (2013.01); *G10L 2015/223* (2013.01)

(58) Field of Classification Search
CPC ............... G10L 2015/223; G10L 25/78; G10L 2025/783; G10L 25/81; G10L 25/84; G10L 25/87
See application file for complete search history.

(56) References Cited

OTHER PUBLICATIONS

Tsujino, Kosuke, et al., "Natural Language Interface Technology," Journal of the Japanese Society of Artificial Intelligence, vol. 28, vol. 1 (Jan. 2013).

* cited by examiner

APPROPRIATE UTTERANCE ESTIMATE MODEL LEARNING APPARATUS, APPROPRIATE UTTERANCE JUDGEMENT APPARATUS, APPROPRIATE UTTERANCE ESTIMATE MODEL LEARNING METHOD, APPROPRIATE UTTERANCE JUDGEMENT METHOD, AND PROGRAM

CROSS-REFERENCE TO RELATED APPLICATIONS

This application is a U.S. 371 Application of International Patent Application No. PCT/JP2019/004406, filed on 7 Feb. 2019, which application claims priority to and the benefit of JP Application No. 2018-020773, filed on 8 Feb. 2018, the disclosures of which are hereby incorporated herein by reference in their entireties.

TECHNICAL FIELD

The present invention relates to a technique for determining whether an uttered speech detected from an input speech is a speech suitable for a predetermined purpose or not.

BACKGROUND ART

Technology for detecting/recognizing an uttered speech includes various fields, and one of them is spoken dialogue processing. In the spoken dialogue processing field, various systems have been proposed and have been in practical use (Non-Patent Literature 1 and Non-Patent Literature 2).

CITATION LIST

Non-Patent Literature

Non-Patent Literature 1: Diane Litman and Kate Forbes-Riley, "Evaluating a Spoken Dialogue System that Detects and Adapts to User Affective States", Proceedings of SIGDIAL 2014 Conference, Philadelphia, U.S.A., pp. 181-185, 2014.

Non-Patent Literature 2: Kosuke Tsujino, Minoru Etoh, Yoshinori Isoda, Shinya Iizuka, "Speech Recognition and Natural Language Interface in Industry", Journal of Japanese Society for Artificial Intelligence, 28 (1), pp. 75-81, 2013.

SUMMARY OF INVENTION

Technical Problem

Among conventional spoken dialogue processing systems, there is a spoken dialogue processing system that speech-recognizes a speech detected first and advances dialogue processing. Therefore, there is a problem that, if a little noise is detected as an uttered speech, the dialogue breaks down. Therefore, it is important to use an uttered speech detected from an input speech after determining whether the uttered speech is a speech suitable for being used for a predetermined speech processing application or not.

Therefore, an object of the present invention is to provide a technique for determining whether an uttered speech detected from an input speech is a speech suitable for a predetermined purpose or not.

Means for Solving the Problem

An aspect of the present invention includes: an utterance detection unit that detects, from an input speech including a speech uttered by a speaker and a noise, an uttered speech corresponding to the speech uttered by the speaker and extracting an acoustic feature of the uttered speech; a speech recognition unit that generates a set of speech recognition results with recognition scores, from the uttered speech; a vector expression generation unit that generates a set of speech-recognition-result word vector expressions and a set of speech-recognition-result part-of-speech vector expressions from the set of speech recognition results with recognition scores; and a target utterance estimation model learning unit that learns a target utterance estimation model that outputs a probability of the uttered speech detected from the input speech being an utterance suitable for a predetermined purpose, using the acoustic feature, the set of speech recognition results with recognition scores, the set of speech-recognition-result word vector expressions, the set of speech-recognition-result part-of-speech vector expressions and content uttered by the speaker, the content being a correct answer of the input speech.

An aspect of the present invention includes: an utterance detection unit that detects, from an input speech including a speech uttered by a speaker and a noise, an uttered speech corresponding to the speech uttered by the speaker and extracting an acoustic feature of the uttered speech; a speech recognition unit that generates a set of speech recognition results with recognition scores, from the uttered speech; a vector expression generation unit that generates a set of speech-recognition-result word vector expressions and a set of speech-recognition-result part-of-speech vector expressions from the set of speech recognition results with recognition scores; and a target utterance determination unit that outputs the uttered speech and the set of speech recognition results with recognition scores if it is determined that the uttered speech is an utterance suitable for a predetermined purpose, from the uttered speech, the acoustic feature, the set of speech recognition results with recognition scores, the set of speech-recognition-result word vector expressions and the set of speech-recognition-result part-of-speech vector expressions, using a target utterance estimation model that outputs a probability of the uttered speech detected from the input speech being the utterance suitable for the predetermined purpose.

Effects of the Invention

According to the present invention, it becomes possible to determine whether an uttered speech detected from an input speech is a speech suitable for a predetermined purpose or not.

DESCRIPTION OF EMBODIMENTS

An embodiment of the present invention will be described below in detail. Note that components having the same

First Embodiment

[Target Utterance Estimation Model Learning Device 100]

Figure 1:
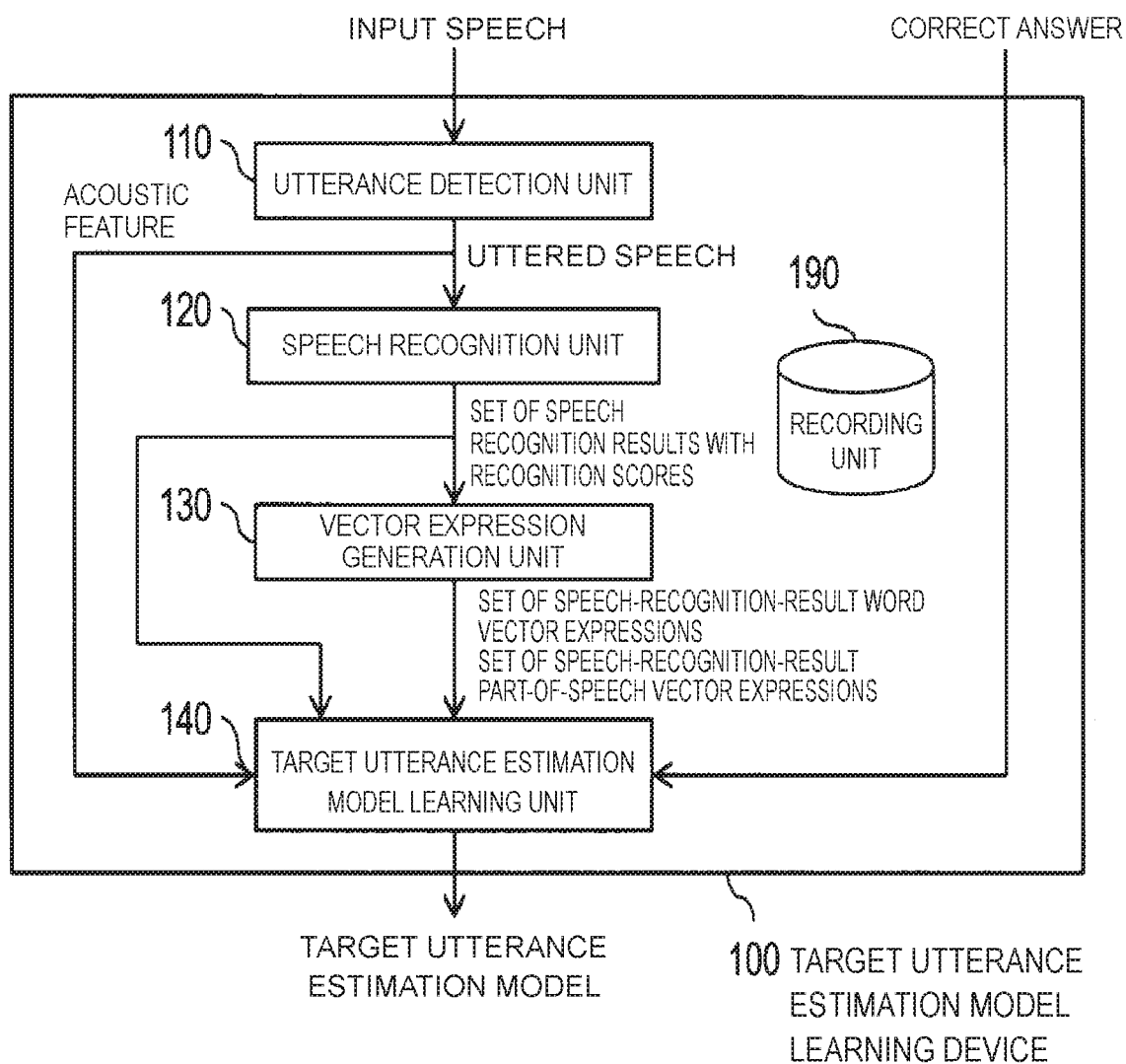
FIG. 1 is a diagram showing an example of a configuration of a target utterance estimation model learning device 100.
Figure 2:
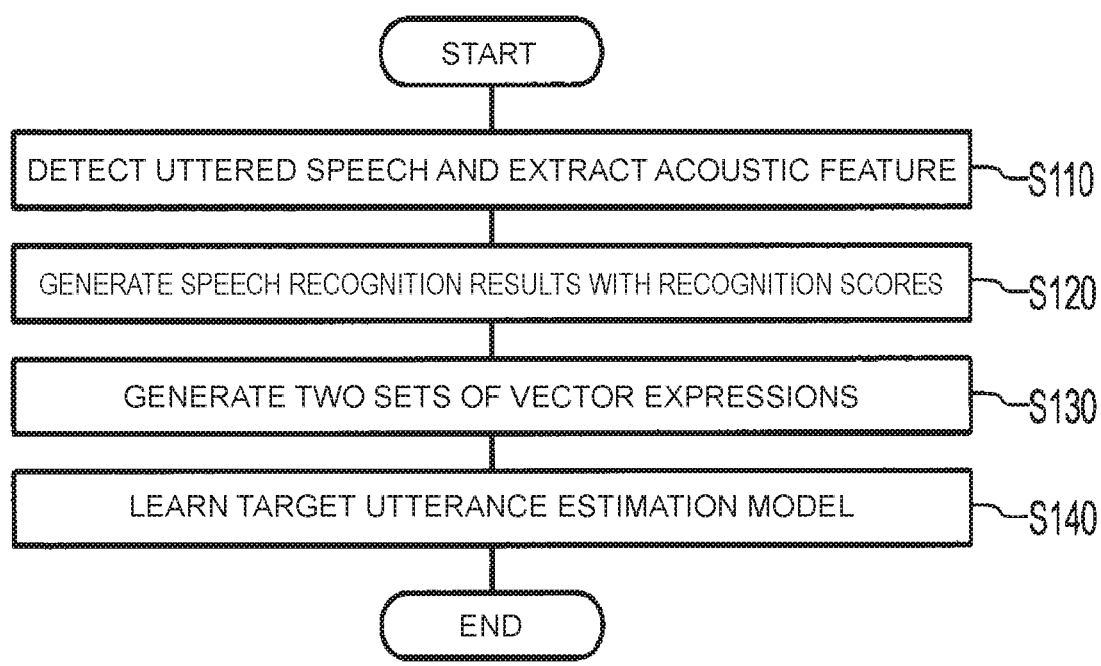
FIG. 2 is a diagram showing an example of an operation of the target utterance estimation model learning device 100.

A target utterance estimation model learning device 100 will be described below with reference to FIGS. 1 and 2. FIG. 1 is a block diagram showing a configuration of the target utterance estimation model learning device 100. FIG. 2 is a flowchart showing an operation of the target utterance estimation model learning device 100. As shown in FIG. 1, the target utterance estimation model learning device 100 includes an utterance detection unit 110, a speech recognition unit 120, a vector expression generation unit 130, a target utterance estimation model learning unit 140 and a recording unit 190. The recording unit 190 is a component to appropriately record information required for processing of the target utterance estimation model learning device 100.

The target utterance estimation model learning device 100 learns a target utterance estimation model that outputs a probability of an uttered speech detected from an input speech being an utterance suitable for a predetermined purpose. An input to and a method for learning of the target utterance estimation model will be described later.

The operation of the target utterance estimation model learning device 100 will be described according to FIG. 2.

At S110, the utterance detection unit 110 detects, from an input speech including a speech uttered by a speaker and a noise, the uttered speech corresponding to the speech uttered by the speaker and extracts an acoustic feature of the uttered speech. Here, the input speech is inputted as a speech waveform, and the uttered speech is detected as a speech waveform. As the acoustic feature, for example, speech power or an SN ratio is used. For detection of the uttered speech, for example, a method described in Reference Patent Literature 1 or Reference Non-Patent Literature 1 can be used.
(Reference Patent Literature 1: Japanese Patent Laid-Open 2014-29407)
(Reference Non-Patent Literature 1: Masakiyo Fujimoto and Tomohiro Nakatani, "Feature enhancement based on generative-discriminative hybrid approach with GMMs and DNNs for noise robust speech recognition", in Proceedings of ICASSP 2015, pp. 5019-5023, 2015.)

Note that the utterance detection unit 110 outputs the uttered speech to the speech recognition unit 120, and the acoustic feature to the target utterance estimation model learning unit 140.

At the time of detecting the uttered speech, the utterance detection unit 110 may detect utterance start time and utterance end time together. In this case, the utterance detection unit 110 outputs the uttered speech to the speech recognition unit 120, and the utterance start time, the utterance end time and an acoustic feature value to the target utterance estimation model learning unit 140.

At S120, the speech recognition unit 120 generates a set of speech recognition results with recognition scores from the uttered speech detected at S110. In general, when an uttered speech is speech-recognized, a plurality of speech recognition results are generated as candidates. A speech recognition result has content estimated to have been uttered by a speaker, and is expressed, for example, as text. Further, for each speech recognition result, a recognition score (for example, reliability, an acoustic score or a language score) to be an indicator of rightness of the speech recognition result is also generated together. Note that the recognition score may be a numerical value of any one of the reliability, the acoustic score and the language score or may be a combination thereof. Here, the reliability is a numerical value that indicates how confidently the speech recognition unit 120, which is a speech recognition engine, outputs a word of a recognition result. For each word of a recognition result, there is a tendency that the more candidates there are, the lower the reliability is. The acoustic score is a score outputted by an acoustic model, that is, a score indicating similarity between an acoustic feature of an uttered speech, which is an input, and a feature of the acoustic model. When both are similar to each other, the acoustic score has a high value. The language score is a score outputted by a language model, that is, a score indicating a degree of matching between a word sequence, which is a recognition result, and the language model. When both match with each other, the language score has a high value.

Therefore, the set of speech recognition results with recognition scores is a set of speech recognition results (words) that are given recognition scores.

At S130, the vector expression generation unit 130 generates, from the set of speech recognition results with recognition scores generated at S120, a set of speech-recognition-result word vector expressions and a set of speech-recognition-result part-of-speech vector expressions. The set of speech-recognition-result word vector expressions is a set having what are obtained by expressing words included in speech recognition results as vectors (hereinafter referred to as word vector expressions) as elements, and the set of speech-recognition-result part-of-speech vector expressions is a set having what are obtained by expressing parts of speech of words included in speech recognition results as vectors (hereinafter referred to as part-of-speech vector expressions) as elements. Specifically, each vector expression is generated as below. First, the vector expression generation unit 130 executes morphological analysis for each of the speech recognition results included in the set of speech recognition results with recognition scores to perform, for each word, writing with a space between the word and an adjoining word. It is assumed that, for each word written with a space between the word and an adjoining word by the morphological analysis, at least part-of-speech information has been obtained. Next, for each word written with a space between the word and an adjoining word, a word vector expression is generated using a word vector expression generation technique like word2vec (skip-gram) described in Reference Non-Patent Literature 2. (Reference Non-Patent Literature 2: T. Mikolov, I. Sutskever, K. Chen, G. Corrado, J. Dean, "Distributed Representations of Words and Phrases and their Compositionality", Cornell University Library, arXiv: 1310.4546 [cs.CL], "https://arxiv.org/pdf/1310.4546v1.pdf", 2013.)

Further, for a part of speech of each word written with a space between the word and an adjoining word, by converting the part of speech to a vector expression, for example, with 1-of-K expression, a part-of-speech vector expression is generated.

At S140, the target utterance estimation model learning unit 140 learns a target utterance estimation model using the acoustic feature extracted at S110, the set of speech recognition results with recognition scores generated at S120, the set of speech-recognition-result word vector expressions and the set of speech-recognition-result part-of-speech vector expressions generated at S130 and content uttered by the speaker, which is a correct answer of the input speech inputted at S110. Since an input speech is time-series data, a target utterance estimation model can be learned, for example, by a neural network capable of handling time-series data like RNN (Recurrent Neural Networks), LSTM (Long Short-Term Memory) or GRU (Gated Recurrent Unit). In other words, a target utterance estimation model is a model learned by a neural network capable of handling time-series data (hereinafter referred to as a time-series statistical model). An input to a target utterance estimation model is a sequence of a combination of a recognition score of each word, word vectors, part-of-speech vectors and an acoustic feature of each word generated from a set of speech recognition results with recognition scores, which is data showing content of an uttered speech, a set of speech-recognition-result word vector expressions, a set of speech-recognition-result part-of-speech vector expressions, and an acoustic feature of the uttered speech. Here, the acoustic feature of each word indicates an acoustic feature that a speech waveform of each word has. Further, the acoustic feature of each word may be a combination of individual acoustic features (speech power, an SN ratio and the like). Therefore, a target utterance estimation model is a time-series statistical model which, with a sequence of a combination of a recognition score of each word, word vectors, part-of-speech vectors and an acoustic feature of each word that has been generated from an uttered speech detected from an input speech as an input, outputs a probability of the uttered speech being an utterance suitable for a predetermined purpose (hereinafter referred to as an output class posterior probability).

Note that calculation is performed with the output class posterior probability indicated by p, and a rejection class posterior probability indicated by 1−p. In other words, the rejection class posterior probability is a probability of rejecting an uttered speech detected from an input speech, regarding the uttered speech as not being suitable for a predetermined purpose.

As stated before, if the utterance detection unit 110 detects the utterance start time and the utterance end time together at S110, the utterance start time and the utterance end time become an input to the target utterance estimation model learning unit 140. In other words, at S140, the target utterance estimation model learning unit 140 learns a target utterance estimation model using the acoustic feature extracted at S110, the utterance start time and utterance end time detected at S110, the set of speech recognition results with recognition scores generated at S120, the set of speech-recognition-result word vector expressions and set of speech-recognition-result part-of-speech vector expressions generated at S130, and content of the utterance of the speaker, which is a correct answer of the input speech inputted at S110. At this time, an utterance time length calculated as a difference between the utterance end time and the utterance start time is also an input to the target utterance estimation model. In other words, a target utterance estimation model becomes a time-series statistical model which, with a sequence of a combination of a recognition score of each word, word vectors, part-of-speech vectors and an acoustic feature of each word, and an utterance time length as an input, outputs an output class posterior probability. By adding an utterance time length to an input to a target utterance estimation model, it becomes possible to learn the target utterance estimation model in consideration of the length of the utterance time length. Therefore, for example, if the utterance detection unit 110 (of a target utterance determination device 200 to be described later) misdetects a sudden noise as an uttered speech the utterance time length of which is short, it becomes possible (for a target utterance determination unit 240) to reject the sudden noise using the target utterance estimation model.

[Target Utterance Determination Device 200]

Figure 3:
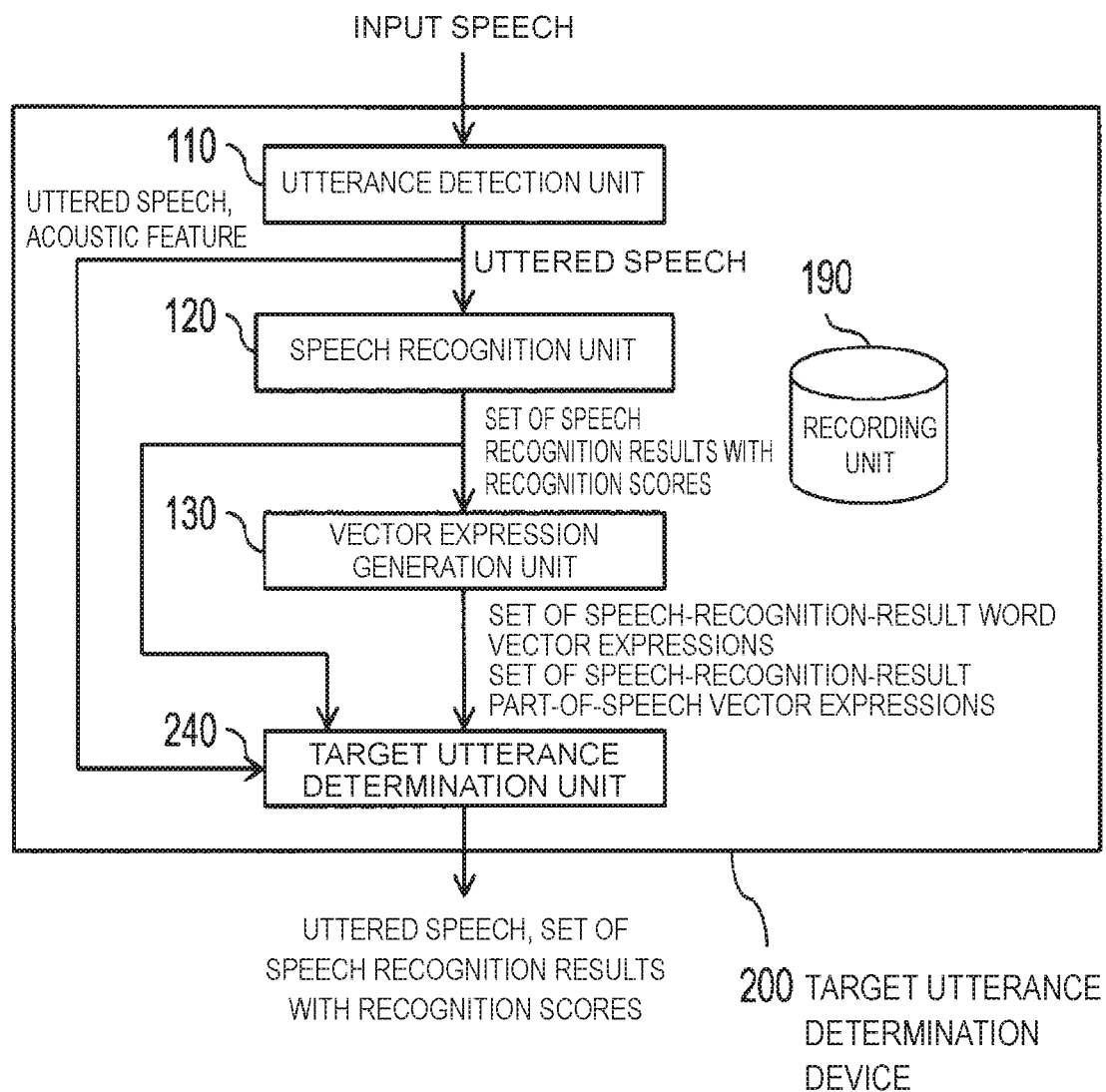
FIG. 3 is a diagram showing an example of a configuration of a target utterance determination device 200.
Figure 4:
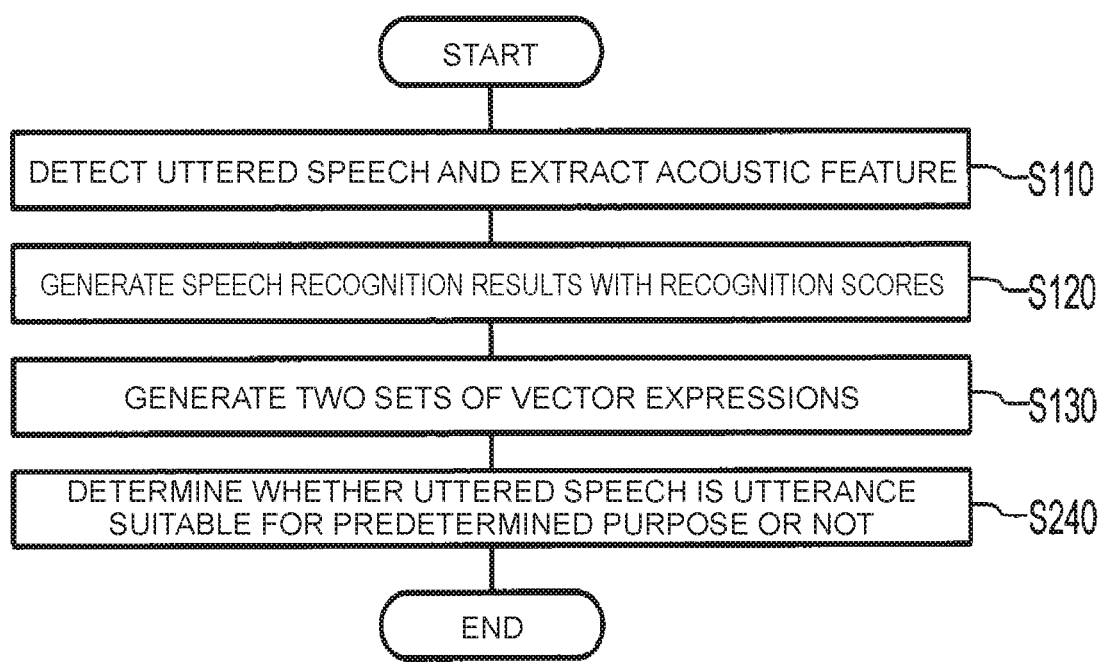
FIG. 4 is a diagram showing an example of an operation of the target utterance determination device 200.

The target utterance determination device 200 will be described below with reference to FIGS. 3 and 4. FIG. 3 is a block diagram showing a configuration of the target utterance determination device 200. FIG. 4 is a flowchart showing an operation of the target utterance determination device 200. As shown in FIG. 3, the target utterance determination device 200 includes an utterance detection unit 110, a speech recognition unit 120, a vector expression generation unit 130, the target utterance determination unit 240 and a recording unit 190. The recording unit 190 is a component to appropriately record information required for processing of the target utterance determination device 200. For example, a target utterance estimation model learned by the target utterance estimation model learning device 100 is recorded.

The target utterance determination device 200 determines whether an uttered speech detected from an input speech is an utterance suitable for a predetermined purpose or not, using a target utterance estimation model.

The operation of the target utterance determination device 200 will be described according to FIG. 4. The target utterance determination unit 240 will be described below.

If it is determined, from the uttered speech detected at S110, the acoustic feature extracted at S110, the set of speech recognition results with recognition scores generated at S120, and the set of speech-recognition-result word vector expressions and set of speech-recognition-result part-of-speech vector expressions generated at S130, that the uttered speech is an utterance suitable for a predetermined purpose at S240, using the target utterance estimation model, then the target utterance determination unit 240 outputs the uttered speech and the set of speech recognition results with recognition scores. Specifically, processing is performed in the following procedure. First, the sequence of the combination of the recognition score of each word, the word vectors, the part-of-speech vectors and the acoustic feature of each word generated from the set of speech recognition results with recognition scores, the set of speech-recognition-result word vector expressions, the set of speech-recognition-result part-of-speech vector expressions and the acoustic feature is inputted to the target utterance estimation model to obtain the output class posterior probability p of the uttered speech as an output. Next, p/(1−p), a ratio of the output class posterior probability p and the rejection class posterior probability 1−p, is calculated. Lastly, the p/(1−p) ratio, the ratio of the output class posterior probability to the rejection class posterior probability, is compared with a predetermined threshold θ. If p/(1−p)>θ (or p/(1−p)≥θ) is satisfied, it is determined that the uttered speech is an utterance suitable for the predetermined purpose, and a combination of the uttered speech and the set of speech recognition results with recognition scores is outputted. On the other hand, if p/(1−p)≤θ (or p/(1−p)<θ) is satisfied, it is determined that the uttered speech is not an utterance suitable for the predetermined purpose, and the determination is outputted.

Note that it is assumed that, if the utterance detection unit 110 of the target utterance estimation model learning device 100 also detects utterance start time and utterance end time, the utterance detection unit 110 of the target utterance determination device 200 also detects the utterance start time and the utterance end time and outputs them to the target utterance determination unit 240.

According to the invention of the present embodiment, it becomes possible to determine whether an uttered speech detected from an input speech is a speech suitable for a predetermined purpose or not. For example, since it becomes possible to reject an uttered speech that is not suitable for a spoken dialogue, a smooth spoken dialog becomes possible. Since data showing content of an uttered speech is used to determine whether or not to reject the uttered speech, it becomes possible to determine whether the uttered speech is suitable for an assumed purpose of spoken dialogue or not and reject the uttered speech as necessary. Further, since both of the data showing content of an uttered speech and an acoustic feature are used, it becomes possible to, for example, when a speech is a background noise (for example, noise of TV audio or the like) though the assumed purpose of spoken dialogue is similar, reject the uttered speech as necessary.

<Supplementary Notes>

For example, as a single hardware entity, a device according to the present invention is configured with an input unit to which a keyboard and the like can be connected, an output unit to which a liquid crystal display and the like can be connected, a communication unit to which a communication device capable of communicating with the outside of the hardware entity (for example, a communication cable) can be connected, a CPU (Central Processing Unit; the CPU may be provided with a cache memory, registers and the like), a RAM and a ROM which are memories, and an external storage device which is a hard disk. Further, the device of the present invention has a bus connecting these input unit, output unit, communication unit, CPU, RAM, ROM and external storage device to enable exchange of data thereamong. Further, the hardware entity may be provided with a device (a drive) or the like capable of performing reading from and writing to a recording medium such as a CD-ROM as necessary. As a physical entity provided with such hardware resources, a general-purpose computer or the like can be given.

Programs required to realize the functions described above, and data and the like required for processing of the programs are stored in the external storage device of the hardware entity (the storage is not limited to the external storage device, but the programs may be stored, for example, in the ROM which is a read-only storage device). Further, data and the like obtained by the processing of the programs are appropriately stored into the RAM, the external storage device or the like.

In the hardware entity, each program and data required for processing of the program, which are stored in the external storage device (or the ROM or the like) are read into the memory as necessary, and interpretation, execution and processing are appropriated performed by the CPU. As a result, the CPU realizes a predetermined function (each constituent feature indicated by the . . . unit, the . . . means or the like described above).

The present invention is not limited to the embodiment described above but can be appropriately changed within a range not departing from the spirit of the present invention. Further, the processings described in the above embodiment are not only chronologically executed in description order. The processings may be also executed in parallel or individually according to processing capacity of the device that executes the processings or as necessary.

In the case of executing the processing functions of the hardware entity (the device of the present invention) described in the above embodiment by a computer as described above, processing content of the functions that the hardware entity should have is written by a program. Then, by executing the program on the computer, the processing functions of the hardware entity are realized on the computer.

The program in which the processing content is written can be stored in a computer-readable recording medium. As the computer-readable recording medium, any recording medium, for example, a magnetic recording device, an optical disc, a magneto-optical recording medium, a semiconductor memory or the like is possible. Specifically, for example, a hard disk device, a flexible disc, a magnetic tape or the like can be used as a magnetic recording device; a DVD (Digital Versatile Disc), a DVD-RAM (Random Access Memory), a CD-ROM (Compact Disc Read-Only Memory), a CD-R (Recordable)/RW (ReWritable) or the like can be used as an optical disc; an MO (Magneto-Optical disc) or the like can be used as a magneto-optical recording medium; and an EEP-ROM (Electronically Erasable and Programmable-Read Only Memory) or the like can be used as a semiconductor memory.

Distribution of the program is performed by selling, transferring, lending and the like of a portable recording medium such as a DVD or a CD-ROM in which the program is recorded. Furthermore, a configuration is also possible in which the program is stored in a storage device of a server computer, and the program is distributed by transferring the program from the server computer to other computers via a network.

For example, the computer that executes such a program stores the program recorded in a portable recording medium or transferred from a server computer into its storage device once. Then, at the time of executing processing, the computer reads the program stored in its storage medium and executes processing according to the read program. As another form of executing the program, the computer may read the program directly from a portable recording medium and execute processing according to the program. Furthermore, each time a program is transferred to the computer from a server computer to the computer, the computer may successively execute processing according to the received program. Further, a configuration is also possible in which the above processing is executed by a so-called ASP (Application Service Provider) type service in which, without transferring the program from a server computer to the computer, the processing functions are realized only by an instruction to execute the program and acquisition of a result. Note that it is assumed that the program in the above embodiment includes information to be provided for processing by an electronic calculator and is equivalent to a program (data or the like that is not a direct command to the computer but has a nature of specifying processing of the computer).

Further, though it is assumed in the above embodiment that the hardware entity is configured by causing a predetermined program to be executed on a computer, at least a part of the processing content may be realized as hardware.

The invention claimed is:

1. A computer-implemented method for generating aspects of utterance, the method comprising:
   receiving an input speech, the input speech comprising a speech uttered by a speaker and a noise;
   detecting, based the input speech, an utterance, the utterance corresponding to the speech uttered by the speaker;
   extracting an acoustic feature from the uttered speech;
   generating a set of speech recognition results with recognition scores based on the uttered speech;

generating a set of speech-recognition-result word vector expressions and a set of speech-recognition-result part-of-speech vector expressions based on the set of speech recognition results with recognition scores;

generating a target utterance estimation model based on the extracted acoustic feature, the generated set of speech recognition results with recognition scores, the generated set of speech-recognition-result word vector expressions, an utterance time length of the uttered speech, and the generated set of speech-recognition-result part-of-speech vector expressions;

providing, by the generated target utterance estimation model, a probability of the uttered speech detected from the input speech being an utterance suitable for a predetermined purpose, wherein the generated target utterance estimation model predicts at least a part of the uttered speech as a sudden noise based at least on a combination of the generated set of speech-recognition-result word vector expressions and the utterance time length of the uttered speech, wherein the predetermined purpose excludes the sudden noise; and causing, based on the probability of the uttered speech detected from the input speech being the utterance suitable for the predetermined purpose, removal of the at least a part of the uttered speech as the sudden noise.

2. The method of claim 1, wherein the target utterance estimation model is based at least on a sequence of a combination of:
a recognition score of a word based at least on the set of speech recognition results with recognition scores,
a word vector of the word based at least on the set of speech-recognition-result word vector expressions,
a part-of-speech vector of the word based on the set of speech-recognition-result part-of-speech vector expressions, and
an acoustic feature of the word based on the acoustic feature of the uttered speech.

3. The method of claim 1, the method further comprising:
rejecting the input speech as a background noise based on the probability of the uttered speech from the input speech being the utterance suitable for a predetermined purpose, wherein the predetermined purpose includes a spoken dialogue.

4. The method of claim 1, wherein the target utterance estimation model is a model learned by a neural network, the neural network processing time-series data.

5. The method of claim 1, the method further comprising:
receiving, by the target utterance estimation model, a correct answer of the input speech for training the target utterance estimation model, the correct answer being the utterance in a spoken dialogue.

6. The method of claim 1, wherein each of the recognition scores comprises a numerical value based on one or more of a confidence score of speech recognition, an acoustic score indicating a similarity between the acoustic feature of the input speech and a feature based on an acoustic model, and a language score indicating a degree of matching between the speech recognition results and a language model.

7. The method of claim 1, wherein the set of speech-recognition-result word vector expressions comprises a vector generated for each word in the set of speech recognition results with a space between adjacent words based on a morphological analysis, and wherein the set of speech-recognition-result part-of-speech vector expressions comprises a vector generated for each part-of-speech for words in the set of speech recognition results.

8. A system comprising:
a processor; and
a memory storing computer executable instructions that when executed by the processor cause the system to:
receive an input speech, the input speech comprising a speech uttered by a speaker and a noise;
detect, based the input speech, an utterance, the utterance corresponding to the speech uttered by the speaker;
extract an acoustic feature from the uttered speech;
generate a set of speech recognition results with recognition scores based on the uttered speech;
generate a set of speech-recognition-result word vector expressions and a set of speech-recognition-result part-of-speech vector expressions based on the set of speech recognition results with recognition scores;
generate a target utterance estimation model based on the extracted acoustic feature, the generated set of speech recognition results with recognition scores, the generated set of speech-recognition-result word vector expressions, an utterance time length of the uttered speech, and the generated set of speech-recognition-result part-of-speech vector expressions;
provide, by the generated target utterance estimation model, a probability of the uttered speech detected from the input speech being an utterance suitable for a predetermined purpose, wherein the generated target utterance estimation model predicts at least a part of the uttered speech as a sudden noise based at least on a combination of the generated set of speech-recognition-result word vector expressions and the utterance time length of the uttered speech, wherein the predetermined purpose excludes the sudden noise; and
causing, based on the probability of the uttered speech detected from the input speech being the utterance suitable for the predetermined purpose, removal of the at least a part of the uttered speech as the sudden noise.

9. The system of claim 8, wherein the target utterance estimation model is based at least on a sequence of a combination of:
a recognition score of a word based at least on the set of speech recognition results with recognition scores,
a word vector of the word based at least on the set of speech-recognition-result word vector expressions,
a part-of-speech vector of the word based on the set of speech-recognition-result part-of-speech vector expressions, and
an acoustic feature of the word based on the acoustic feature of the uttered speech.

10. The system of claim 8, the computer-executable instructions when executed further causing the system to:
reject the input speech as a background noise based on the probability of the uttered speech from the input speech being the utterance suitable for a predetermined purpose, wherein the predetermined purpose includes a spoken dialogue.

11. The system of claim 8, wherein the target utterance estimation model is a model learned by a neural network, the neural network processing time-series data.

12. The system of claim 8, the computer-executable instructions when executed further causing the system to:
receive, by the target utterance estimation model, a correct answer of the input speech for training the target utterance estimation model, the correct answer being the utterance in a spoken dialogue.

13. The system of claim 8, wherein each of the recognition scores comprises a numerical value based on one or more of a confidence score of speech recognition, an acoustic score indicating a similarity between the acoustic feature of the input speech and a feature based on an acoustic model, and a language score indicating a degree of matching between the speech recognition results and a language model.

14. The system of claim 8, wherein the set of speech-recognition-result word vector expressions comprises a vector generated for each word in the set of speech recognition results with a space between adjacent words based on a morphological analysis, and wherein the set of speech-recognition-result part-of-speech vector expressions comprises a vector generated for each part-of-speech for words in the set of speech recognition results.

15. A computer-readable non-transitory recording medium storing computer-executable instructions that when executed by a processor cause a computer system to:
   receive an input speech, the input speech comprising a speech uttered by a speaker and a noise;
   detect, based the input speech, an utterance, the utterance corresponding to the speech uttered by the speaker;
   extract an acoustic feature from the uttered speech;
   generate a set of speech recognition results with recognition scores based on the uttered speech;
   generate a set of speech-recognition-result word vector expressions and a set of speech-recognition-result part-of-speech vector expressions based on the set of speech recognition results with recognition scores;
   generate a target utterance estimation model based on the extracted acoustic feature, the generated set of speech recognition results with recognition scores, the generated set of speech-recognition-result word vector expressions, an utterance time length of the uttered speech, and the generated set of speech-recognition-result part-of-speech vector expressions;
   provide, by the generated target utterance estimation model, a probability of the uttered speech detected from the input speech being an utterance suitable for a predetermined purpose, wherein the generated target utterance estimation model predicts at least a part of the uttered speech as a sudden noise based at least on a combination of the generated set of speech-recognition-result word vector expressions and the utterance time length of the uttered speech, wherein the predetermined purpose excludes the sudden noise; and
   causing, based on the probability of the uttered speech detected from the input speech being the utterance suitable for the predetermined purpose, removal of the at least a part of the uttered speech as the sudden noise.

16. The computer-readable non-transitory recording medium of claim 15, wherein the target utterance estimation model is based at least on a sequence of a combination of:
   a recognition score of a word based at least on the set of speech recognition results with recognition scores,
   a word vector of the word based at least on the set of speech-recognition-result word vector expressions,
   a part-of-speech vector of the word based on the set of speech-recognition-result part-of-speech vector expressions, and
   an acoustic feature of the word based on the acoustic feature of the uttered speech.

17. The computer-readable non-transitory recording medium of claim 15, the computer-executable instructions when executed further causing the system to:
   reject the input speech as a background noise based on the probability of the uttered speech from the input speech being the utterance suitable for a predetermined purpose, wherein the predetermined purpose includes a spoken dialogue.

18. The computer-readable non-transitory recording medium of claim 15, wherein the target utterance estimation model is a model learned by a neural network, the neural network processing time-series data.

19. The computer-readable non-transitory recording medium of claim 15, the computer-executable instructions when executed further causing the system to:
   receive, by the target utterance estimation model, a correct answer of the input speech for training the target utterance estimation model, the correct answer being the utterance in a spoken dialogue.

20. The computer-readable non-transitory recording medium of claim 15, wherein the set of speech-recognition-result word vector expressions comprises a vector generated for each word in the set of speech recognition results with a space between adjacent words based on a morphological analysis, and wherein the set of speech-recognition-result part-of-speech vector expressions comprises a vector generated for each part-of-speech for words in the set of speech recognition results.

* * * * *